United States Patent [19]
Dumont et al.

[11] Patent Number: 5,930,152
[45] Date of Patent: *Jul. 27, 1999

[54] APPARATUS FOR POSITIONING A HUMAN BODY

[75] Inventors: Daniel Dumont, St. Sauvour; Alain Laferriere, NotreODame de l'Ile Perrot; Eric Guerard, Montreal, all of Canada

[73] Assignee: Semap S.A.R.L., Luxembourg

[ * ] Notice: This patent is subject to a terminal disclaimer.

[21] Appl. No.: 08/644,199

[22] Filed: May 10, 1996

Related U.S. Application Data

[63] Continuation-in-part of application No. 08/390,954, Feb. 21, 1995., Pat. No. 5,642,302

[51] Int. Cl.⁶ .......................... G06F 19/00; G05B 23/02
[52] U.S. Cl. .............. 364/528.37; 128/845; 297/DIG. 4
[58] Field of Search ................................... 364/579, 506, 364/508, 468.01, 468.02, 468.25, 474.01, 474.11, 528.1, 528.37, 528.14, 528.36, 528.4; 128/774, 781, 845; 297/61, 68, 70, 71, 284.3, 284.2, DIG. 4, 284.4, 343; 73/862.625, 172, 379.01, 379.08, 379.09; 5/613, 618; 12/142 N; 482/4

[56] References Cited

U.S. PATENT DOCUMENTS

| | | | |
|---|---|---|---|
| 4,799,276 | 1/1989 | Kadish | 5/613 |
| 4,876,758 | 10/1989 | Rolloff et al. | 12/142 N |
| 4,890,235 | 12/1989 | Reger et al. | 364/468.25 |
| 4,972,351 | 11/1990 | Reger et al. | 364/579 X |
| 5,010,772 | 4/1991 | Bourland et al. | 73/172 X |
| 5,110,183 | 5/1992 | Jeanes, III | 297/343 |
| 5,403,251 | 4/1995 | Belsito et al. | 482/4 |
| 5,505,520 | 4/1996 | Frusti et al. | 297/284.4 |
| 5,544,376 | 8/1996 | Fromson | 5/618 |
| 5,642,302 | 6/1997 | Dumont et al. | 364/579 |

*Primary Examiner*—Melanie A. Kemper
*Attorney, Agent, or Firm*—Hoffman, Wasson & Gitler

[57] ABSTRACT

A device for positioning a human body in a seat, wheelchair or other support is provided. The device enables a user to modify and adjust various components to position the seat to aid the posture of the user, by taking various measurements via sensors and controlling the position of the components to achieve an optimum configuration of the components to support the user. A computer can automatically make the adjustments and can monitor multiple seats. The seats can be truck, car or airplane seats.

17 Claims, 11 Drawing Sheets

APPARATUS FOR POSITIONING A HUMAN BODY

This application is a continuation-in-part of application 08/390,954 filed on Feb. 21, 1995 now U.S. Pat. No. 5,642,302.

BACKGROUND OF THE INVENTION

1. Field of the Invention

The present invention relates to a device for positioning a human body in a wheelchair or other support. More particularly, the present invention relates to a seat which enables a user to modify and adjust various components to position the seat to aid the posture of the user.

2. Description of the Prior Art

Maintaining a comfortable and useful seated posture for a long period of time can be difficult and may require special support. Disabled individuals who are confined or limited to a wheelchair are especially challenged to achieve a comfortable position. Appropriate posture is necessary to prevent pain, sores and injury such as deformity, retain good posture and improve the abilities of people restricted to wheelchairs.

U.S. Pat. No. 4,890,235, to Reger et al, pertains to a computer aided prescription of specialized seats for wheelchairs or other body supports. The system provides a surface which deforms to the shape of an object placed on it, and a sensor generates a force a distribution signal representing the force distribution along the surface. A patient is placed upon the seat causing deformation of the surface. The seat surface is then selectively varied in accordance with the signal from the sensor by manipulating multiple pneumatic actuators. Data generated by the system is transmitted to a fabrication unit which produces a cushion with the desired characteristics.

The Reger et al system however is only of limited use. The chair has sensors in only the seat and backrest with only one pneumatic actuator. The apparatus is designed to be controlled by others while the patient is seated, giving the patient no direct control of the process. The number of factors that need to be incorporated to obtain a comfortable seat for a patient are considerable, and the Reger et al system takes only a couple of factors into consideration. The human back is quite complex and a special support may be require for the head, pelvic region, thoracic region butt, thighs and arms. While the Reger et al system measures a persons contours, such measurements are performed in a static state. There is no provision for moving various components relative to one another prior to taking measurements. Movement of the components relative to one another will affect the readings used in developing the measurements, and therefor need to be considered to produce an optimum chair or support.

SUMMARY OF THE INVENTION

These and other deficiencies of the prior art are addressed by the present invention which is directed to a method and apparatus for producing a seat or patient support which takes measurements from a footrest, the seat, an anterior wedge, the armrests, a pelvic rest, a thoracic rest, a headrest and a backrest.

It is an object of the present invention to over come the deficiencies of the existing system.

Another object is to provide a method and apparatus which has separate components to support a patient, each of which can be independently actuated, and from which positional readings can be derived.

Yet another object of the present invention is to provide a method and apparatus that can be controlled by the patient.

The present invention provides support for a patient's head, pelvic region, thoracic region butt, thighs and arms. Various components may be moved both angularly and linearly relative to one another prior to and subsequent to measurement and a chair or support is produced based upon the final measurement.

The present invention includes pressure sensors or precision transducers, and a system which records data from cards, and a computer that includes operating software that runs the system and allows the operation of one or more positioning chairs.

Position sensors and/or transducers (depending upon the type of chair) are placed at the same level as actuators in order to inform the system of the position and movements of the occupant. The matrix of sensors are installed in the seat, backrest, and all other support regions in order to inform the system of the occupants posture, weight distribution, center of gravity and for auto-detection.

BRIEF DESCRIPTION OF THE DRAWINGS

These and other attributes of the present invention will be described with respect to the following drawings in which.

DETAILED DESCRIPTION OF THE INVENTION

Figure 2:
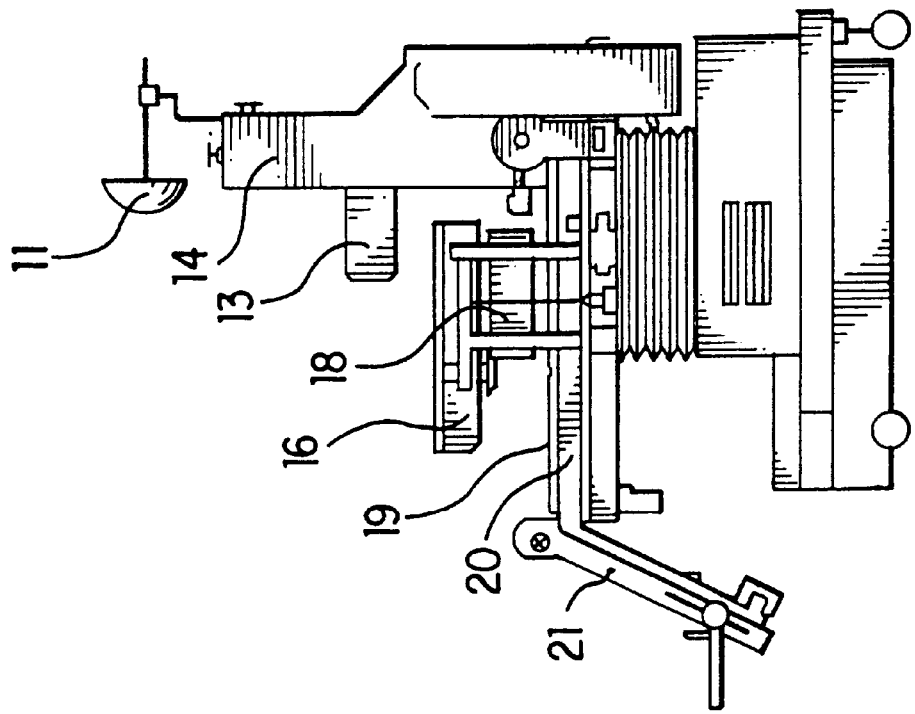
FIG. 2 is a side view of the chair shown in FIG. 1.
Figure 1:
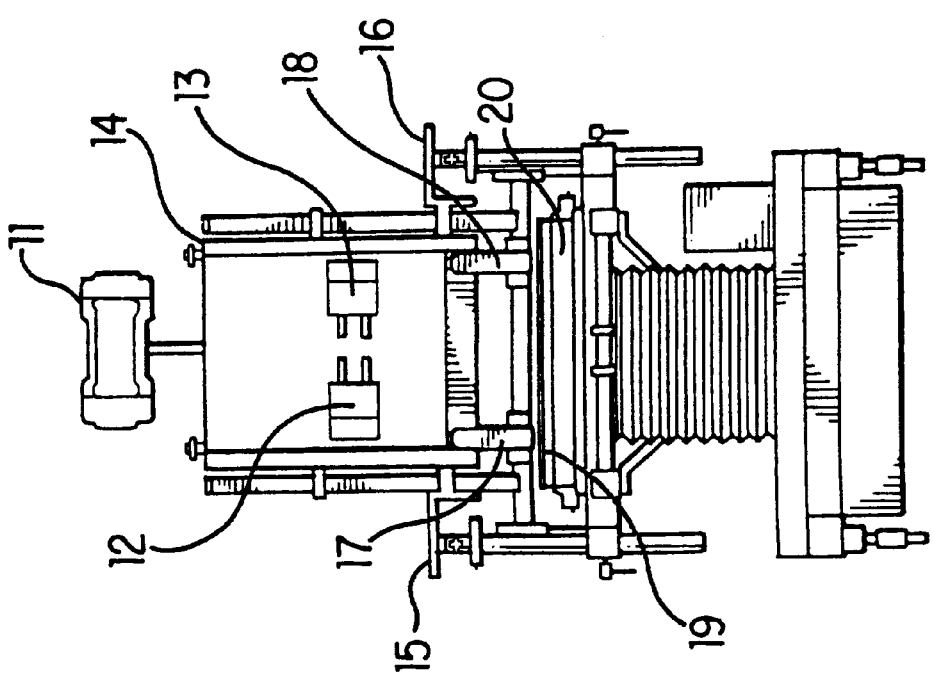
FIG. 1 is a front view of a chair according to the present invention.

Referring to FIGS. 1 and 2, the chair according to the present invention has a backrest 14 and a seat 20, connected to one another and angularly adjustable relative to each other. A left and right armrest, 16 and 15, respectively, extends upwards from the sides of the seat 20. A head rest 11 is provided extending from the top of the backrest 14.

Footrests 21 extend from the front of the seat 20, and are angularly adjustable relative to the seat 20. The length of the left and right footrests 21 are controlled by actuators 61 and 62. Right and left thoracic rests 12 and 13, respectively, extend forward from an upper portion of the backrest 14. The right and left pelvic rests 17 and 18, respectively, extend forward from right and left armrests 15 and 15, respectively, and also toward each other, again from the left and right armrests 15 and 16, respectively. Finally an anterior wedge 19 is provided on the front upper surface of the seat 20.

The positioning of the backrest 14 relative to the seat 20, as well as the positioning of the remaining components: headrest 11, right and left thoracic rest 12 and 13, right and left arm rests 15 and 16, pelvic rests 17 and 18, anterior wedge 19, and footrests 21, can all be varied to achieve an optimum position for a patient, with regard to comfort, support and abilities.

Figure 4:
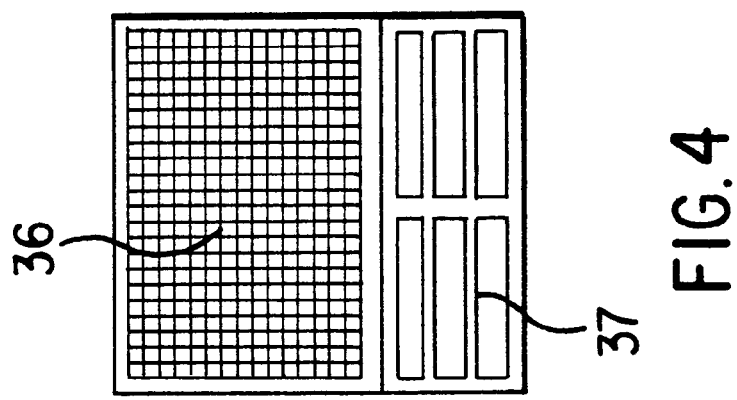
FIG. 4 is a top plan view of the sensors for the seat, armrests and anterior wedge for the seat of FIG. 1.
Figure 3:
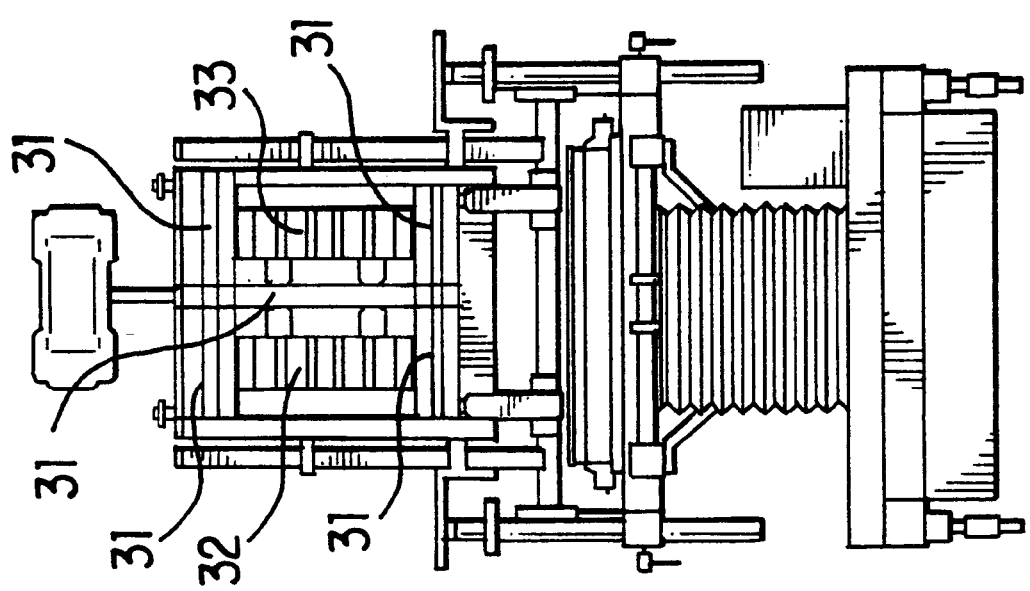
FIG. 3 is a front view of the chair shown in FIG. 1 showing the sensor components.

The chair has sensors in various components to develop data concerning the position of the patient and the orientation of the various components, as shown in FIGS. 3 and 4. Sensors 31 are located in the backrest 14. Sensors 32 are positioned in the right thoracic rest 12 and sensors 33 are positioned in the left thoracic rest 13. Sensors 34 and 35 are located in the right and left armrests 15 and 16, respectively. The seat 20 has sensors 36 and anterior wedge 19 has sensors 37.

Figure 6:
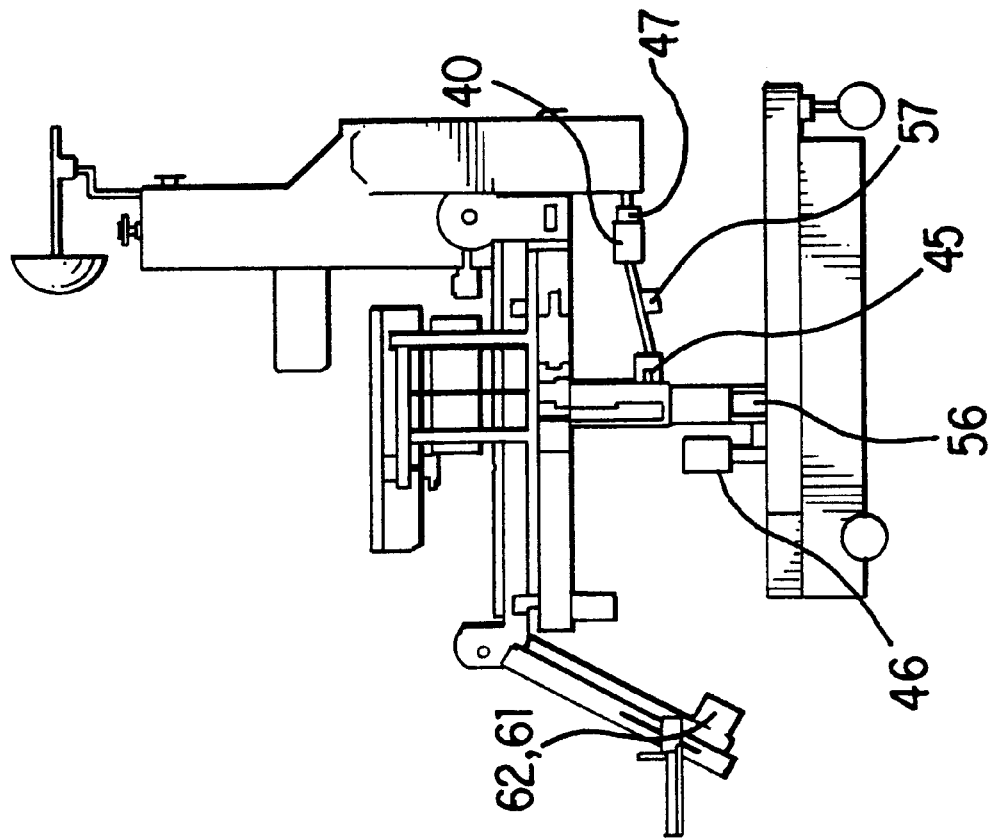
FIG. 6 is a side view of the chair shown in FIG. 5.
Figure 5:
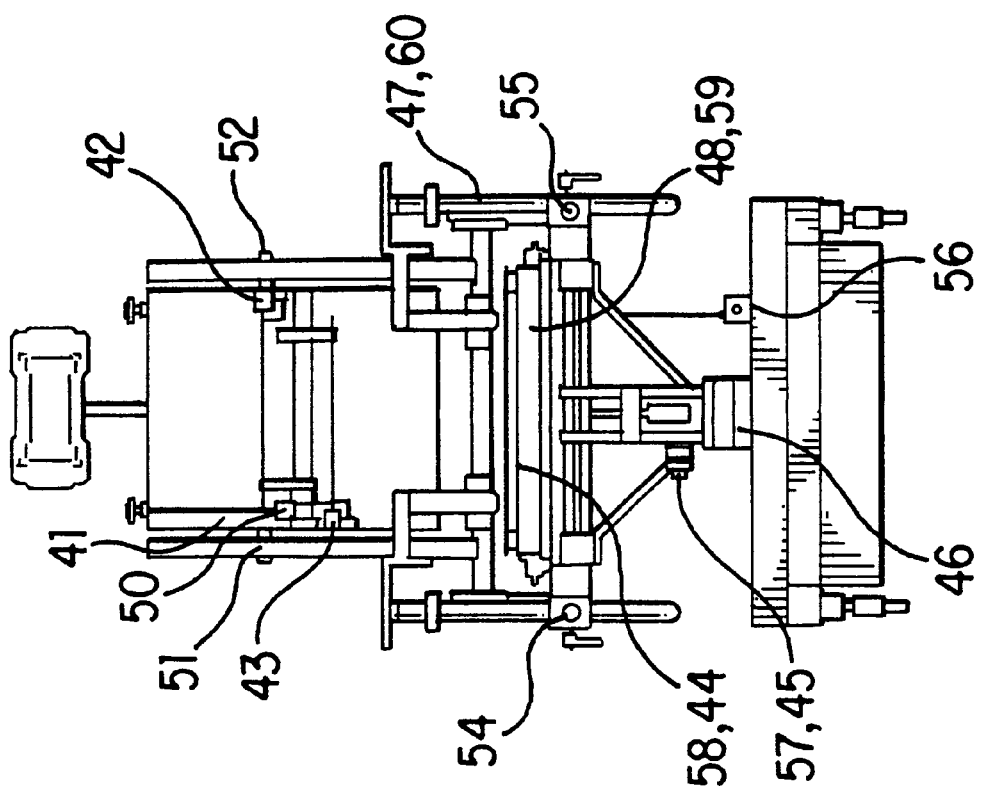
FIG. 5 is a front view of the chair shown in FIG. 1 showing the electromechanical components.

The third major system of the chair of the present invention, is shown in FIGS. 5 and 6, includes a series of actuators and transducer for controlling the movement and position of the various mechanical components of the chair. The actuators control the position of each of the components and the transducers aid in the calculation of the displacement of each component, both angularly and distance wise. An actuator 41 is provided in the backrest 14 to control the height of the head rest 11. An actuator 42 and transducer 51 control the position of the right thoracic rest 12 and an actuator 43 and transducer 52 control the position of the left thoracic rest 13. The position of the anterior wedge 19 is controlled by an actuator 44 and transducer 58.

The position of the seat 20 is controlled by three actuators and two transducers. The angle of the seat 20 relative to the ground is controlled by an actuator 45 and transducer 57. The height of the seat from the ground is controlled by actuator 46 and transducer 56, and distance, or depth, the seat 20 extend from the backrest 14 is controlled by actuator 48 transducer 59. The angle of the backrest 14 relative to the seat 20 is controlled by actuator 47 and transducer 60.

While many devices can be used as the sensors, the preferred sensors are force detector resistive components which are comparable to diaphragm-type commutators, or switches. Capacitive pressure cushions are provided with the system and can also be used for pressure mappings. The capacitive pressure cushions can be placed anywhere on the positioning chair for sensor reading. However, unlike diaphragm-type commutators, the resistance decreases as the force applied to the force detector resistive components increases. For example, a human finger exerting a resistance of from 1 N to 10 N generates a continuous variance in resistance from 400 kilo ohms to 40 kilo ohms. The force detector resistive components are ideal for use in the chair of the present invention which utilizes touch sensitive sensors, as they are relatively inexpensive, are thin, less than 1.5 mm thick, are durable, and can be used in a wide range of environments, as they are intrinsically insensitive to electromagnetic influences and they do not themselves generate interference. The force detector resistive components are available in matrix type arrays, or in individual elements having maximum dimensions of 55 cm by 75 cm, with force sensing capabilities of 20–30 grams to 20–30 kilograms.

Figure 7:
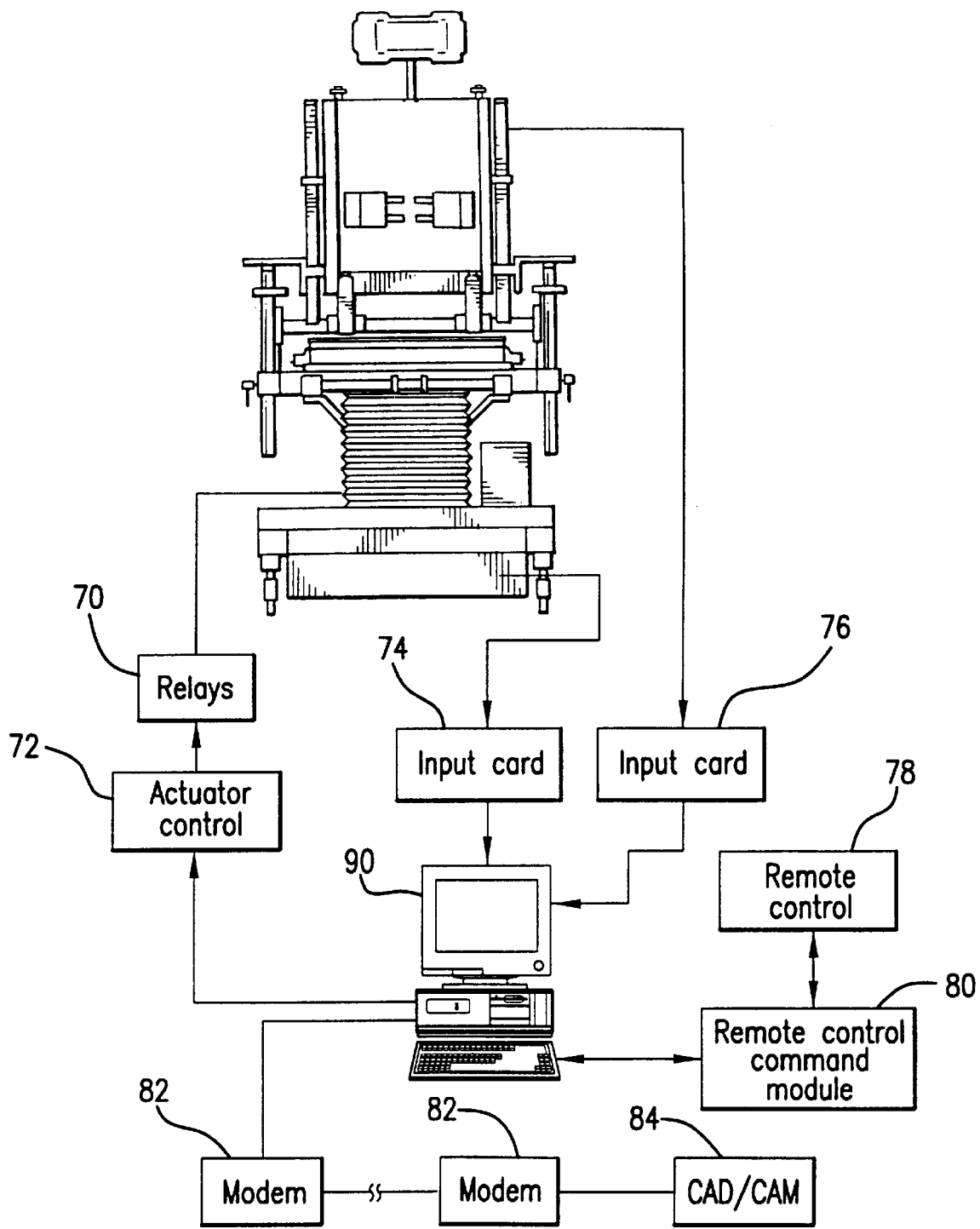
FIG. 7 is a front view of the chair shown in FIG. 1 showing the operational components.

The operation of the chair of the present invention will now be described with reference to FIG. 7. After a patient sits in the chair, the various components are adjusted to achieve a comfortable position. The adjustment of the components can be performed by an operator, or alternatively, the patient can adjust the components using a remote control 78. The remote control is connected to a computer 90 through a remote control command module 80. If the patient is using the remote control 78, signals from the remote control are fed to the control module 80 and the computer 90 to instruct an actuator control 72 to activate one or more of the actuators and/or transducers via relays 70. If an operator is adjusting the position of the various components, the signals for controlling the actuators are generated directly at the computer 90.

The remote control allows the user to affect the spatial positioning of the components the same way an operator would using the same program. The computer program allows for the input of information relating to which specific components are to be utilized in the chair conception.

The various sensors, actuators and transducers send signals back to the computer 90 through input card 76 and 74. The optimum positioning of the various components is determined by trial and error and discussion with the patient. When the computer 90 is first activated, information concerning the patient is input. The patients postural disability is evaluated and the goals to be achieved are determined. The techniques for achieving the goals for the patient are chosen and preset parameters are produced after which sequential settings are developed. The pressure distribution on the sensors of the chair are measured, and a prediagnostic is performed. The results of the prediagnostic are used in an empirical solution and the resulting parameters are authenticated. If the parameters are acceptable a simulation in produced and an assessment report generated. On the other hand, if the parameters are unacceptable, the faulty parameters are identified, a simulation is run, and corrective values are developed. The system then returns to the step of developing sequential settings are proceeds forward again.

The system measures the angles and distances, and can provide pressure point graphics in two or three dimensions. Hard copy print outs can be produced, and/or the information can be sent to a CAD/CAM system 84. The CAD/CAM system may be at a remote location, such as a manufacturing site, and connected by modems 82. It should be noted that the manufacturing system is based upon a sensorial pressure measurement, that allows for shape calculus to a CNC (Computer Numerically Control) milling machine or other. The given ortheses or product will then be obtained. The CAD/CAM system can then produce a chair for each patient tailored to each one's individual needs and dimensions.

The present invention can perform different adjustment functions. First, it can position the seat to provide comfort for most average people. Second, it can better position a person to provide added comfort in particular positions, such as for watching television. The user can manually correct the position of the chair or have the chair perform the correction automatically. Third, the present invention can provide a second degree of comfort and relaxation using both pressure mappings and an occupants center of gravity, either manually or automatically.

The seat can be controlled three ways. Manually where the occupant chooses the seat position himself.

Automatically, where the system determines optimal positioning using pressure mappings and the center of gravity, at any given moment. In auto-correct mode, the system manages the position of the chair and provides correction at any given moment. Information regarding the occupant's favorite physical configurations can be saved in a personalized memory card or location via memory banks. In this manner the user can quickly achieve a favorite position without requiring additional adjustments.

Referring to FIGS. 8–12, a second embodiment of the present invention is shown. Sensor pads 100, functioning in the same manner as the various sensors in the first embodiment, are disposed in various parts of the chair. The sensor pads 100 send data regarding activated pressure to input cards 103 and 104, which is in turn sent and analyzed by computer 105. The computer 105 provides pressure mappings from the data from the activated sensor pads 100. the computer 105 also controls actuators 102 through an actuator control 107 and relays 106. The embodiments shown in FIGS. 8–12 are simplified for illustration purposes and the systems will have more sensor pads and actuators, along the line of the first embodiment set forth in FIGS. 1–7. A control command module 109 gives the occupant or the system operator the ability to adapt the seat or wheelchair via an optional access control card 108, which can contain a particular person's predetermined preset position information.

Figure 9:
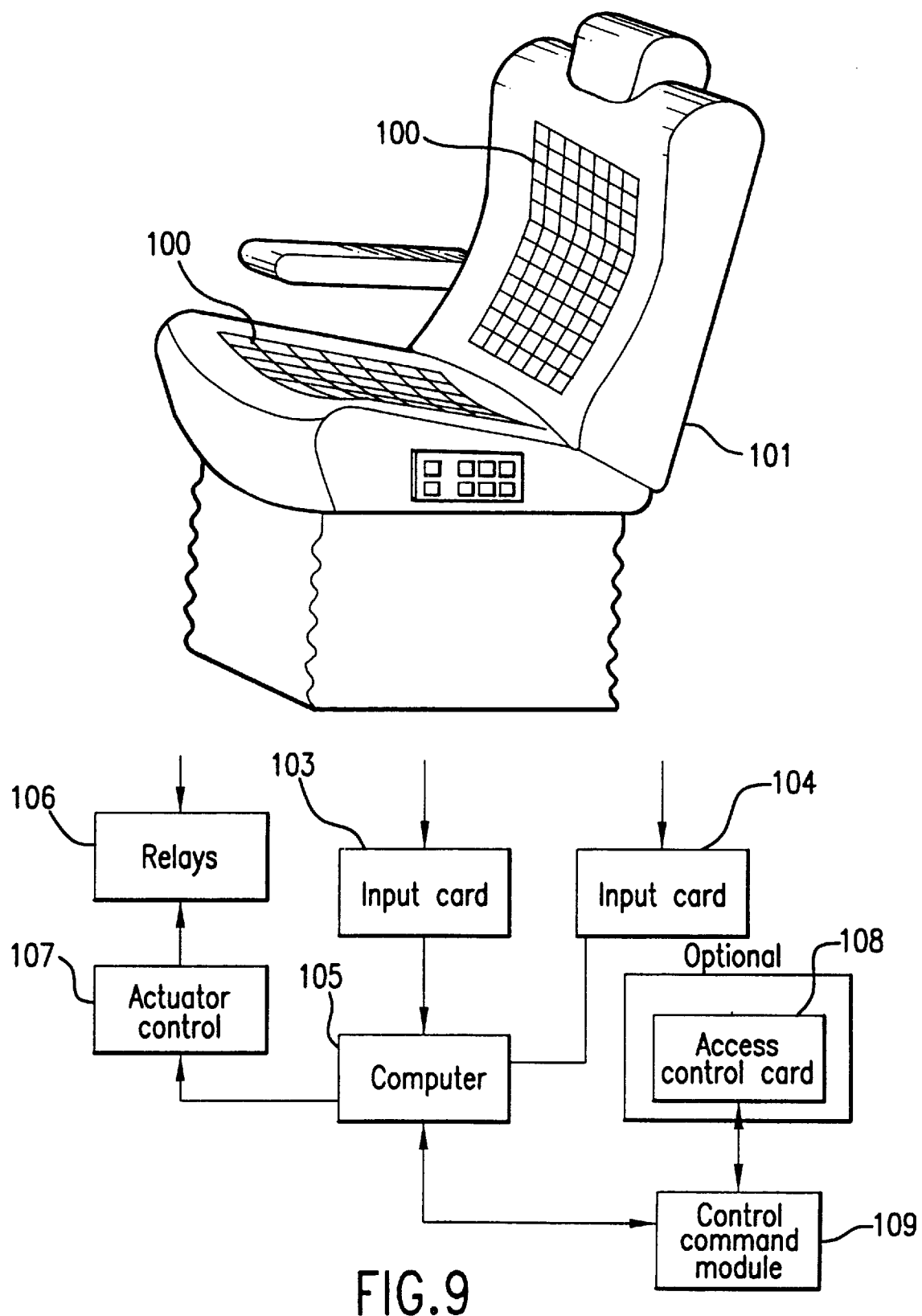
FIG. 9 is a perspective view of a second embodiment of the present invention showing a truck seat and operational components.
Figure 10:
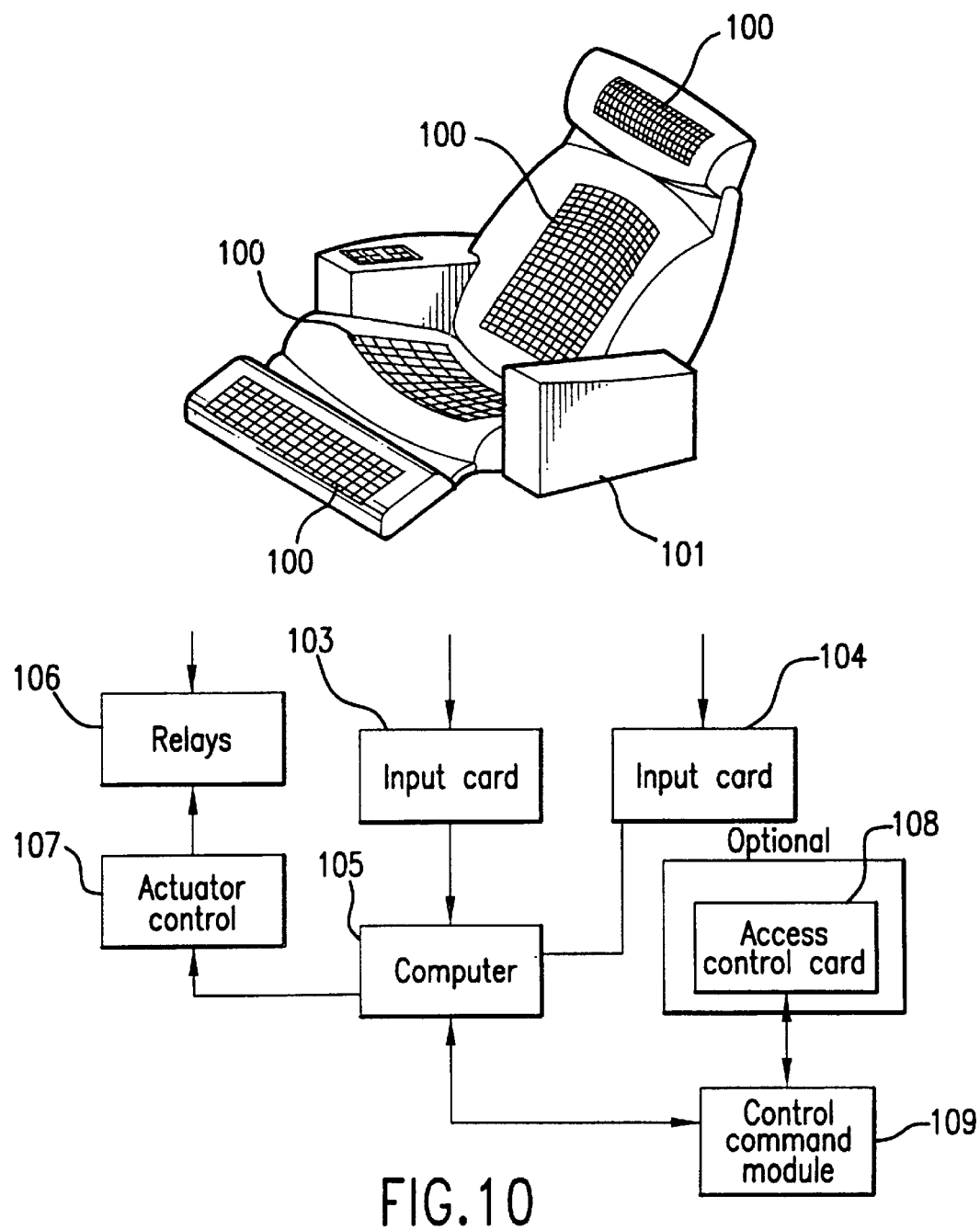
FIG. 10 is a perspective view of an airplane seat having a footrest and incorporating the components shown in FIG. 9.

FIG. 9 shows a truck seat FIG. 10 shows an airplane seat 101 having a footrest. The computer 105 can provide an automatic tally of the passengers using the auto-detection feature of the present invention, which detects if an occupant is situated in the seat 101. Furthermore, the computer 105 can also provide a graph or chart indicating the location of each passenger in the airplane. This feature can be very useful in smaller airplanes where balancing of the weight in the airplane is more critical. The computer 105 can also control the condition, i.e. upright or reclined, of the seats 101 for takeoff and landings. Such control of the condition of the seats 101 can also be useful in an emergency situation. As an additional benefit the seats 101 of the present invention can be moved or vibrated to provide a wake-up service, or be moved under computer 105 control for meal service.

Figure 8:
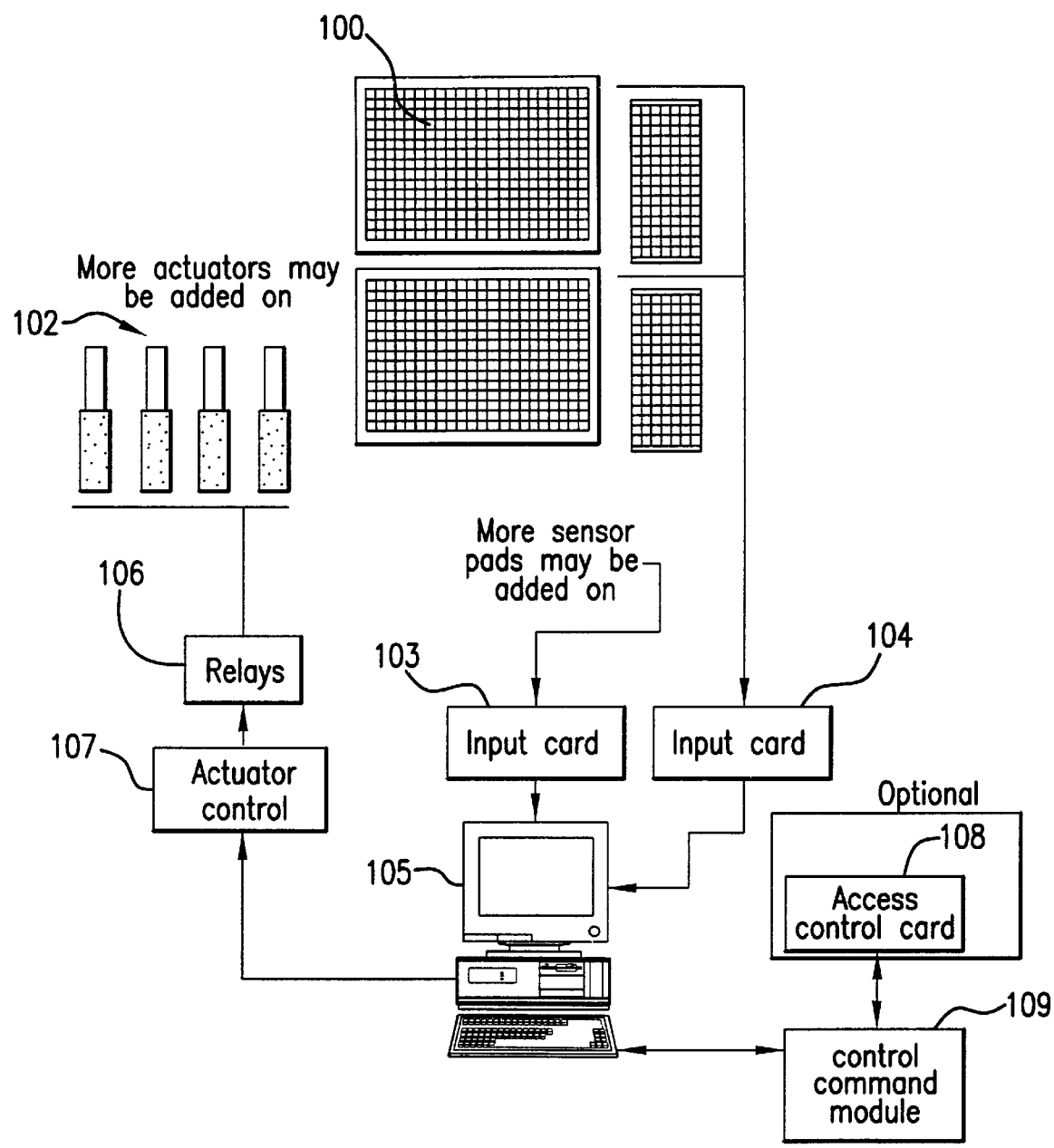
FIG. 8 is a front view of a second embodiment of a chair and operational components.
Figure 11:
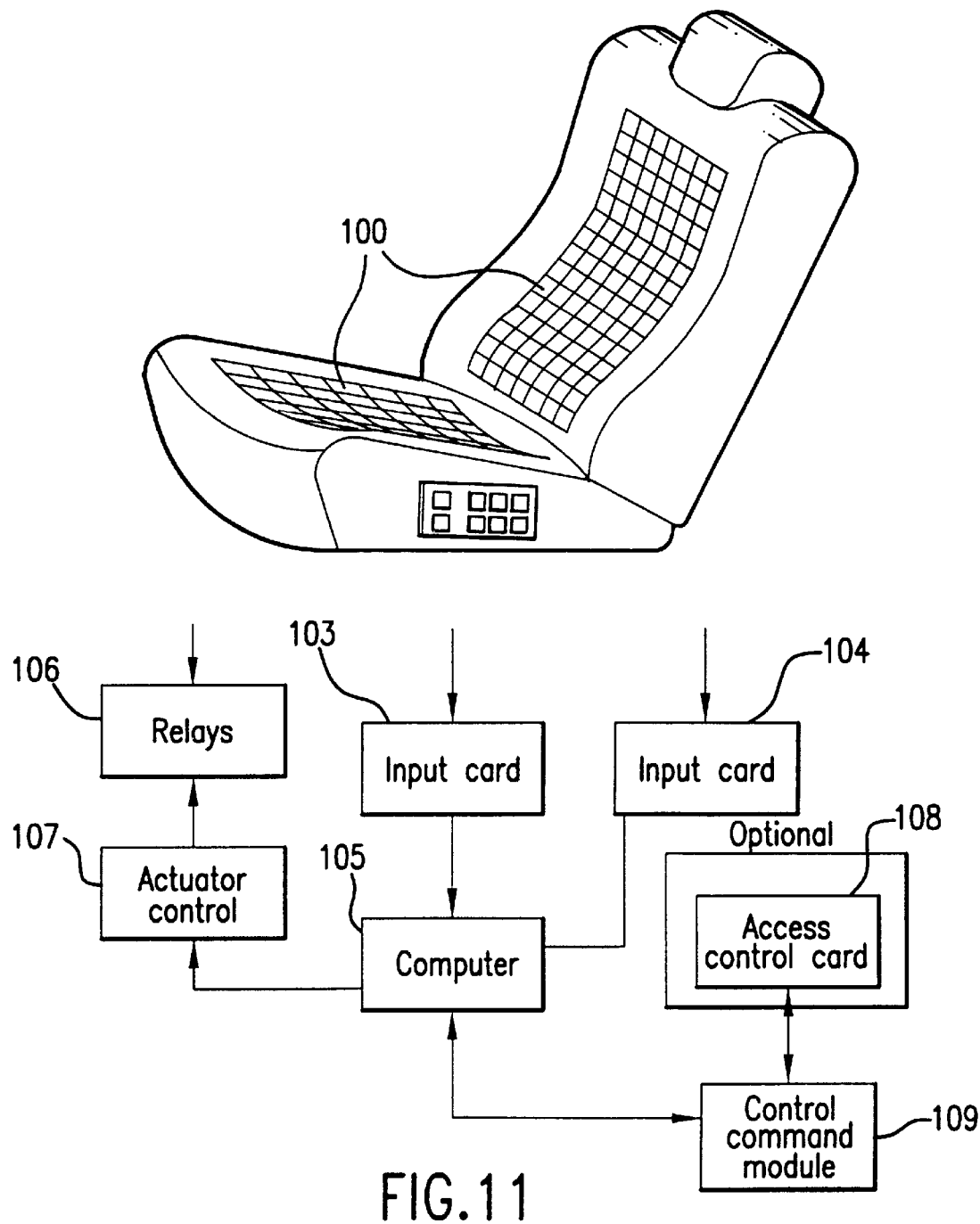
FIG. 11 is a perspective view of a car seat having no armrests and incorporating the components shown in FIG. 9.
Figure 12:
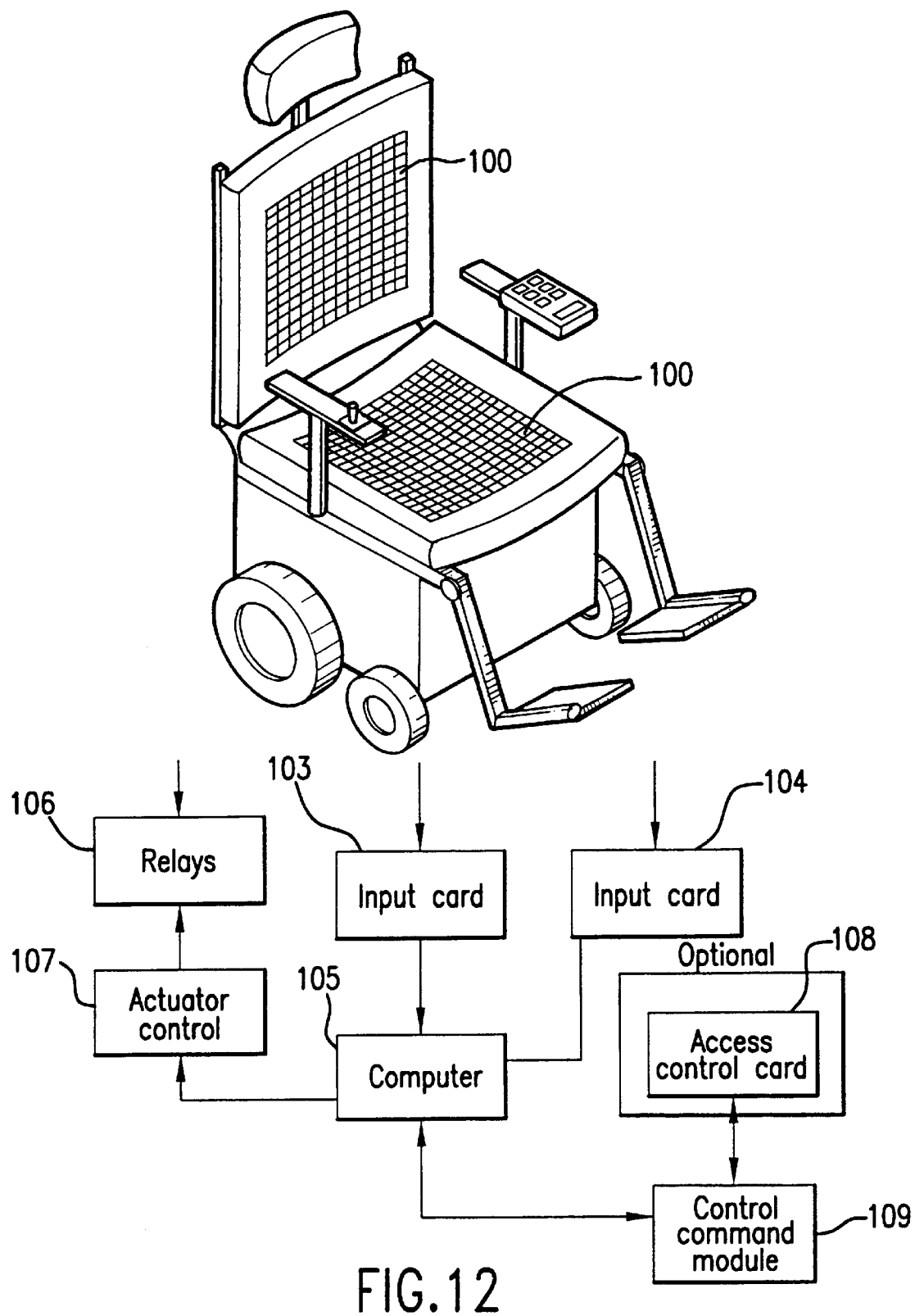
FIG. 12 is a perspective view of a wheelchair incorporating the components shown in FIG. 9.

FIG. 11 illustrates a car seat having no armrests and incorporating the components shown in FIG. 8. FIG. 12 depicts a wheelchair incorporating the components shown in FIG. 8. The computer 105 can run a program regarding modification of the position of the wheelchair components depending upon the time of day, the amount of time spent in the wheelchair and any specific activities undertaken by the occupant. A preset pressure value for sensors at specific locations can be set to provide surveillance of the occupant and warn of improper positioning. The system can then indicate the nature of the mispositioning and suggest modifications to correct the situation, or perform the modifications automatically.

Having described several embodiments of the present invention in accordance with the present invention, it is believed that other modifications, variations and changes will be suggested to those skilled in the art in view of the description set forth above. For example, the present invention is equally applicable to wheelchairs, beds, ortheses, prostheses, corsets and feet. It is therefor to be understood that all such variations, modifications and changes are believed to fall within the scope of the invention as defined in the appended claims.

Figure 13:
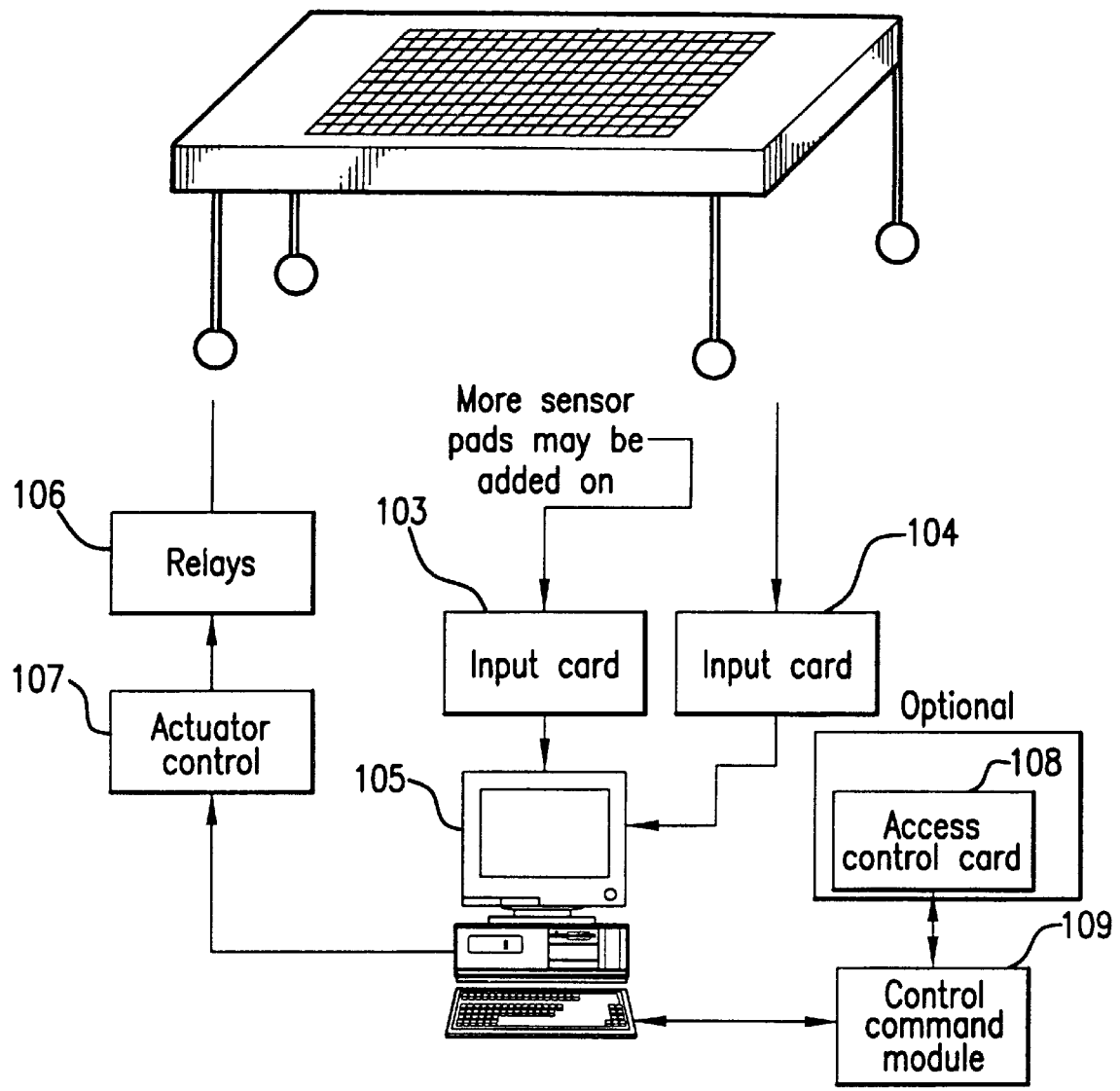
FIG. 13 is a perspective view of a medical bed incorporating the components shown in FIG. 9.
Figure 14:
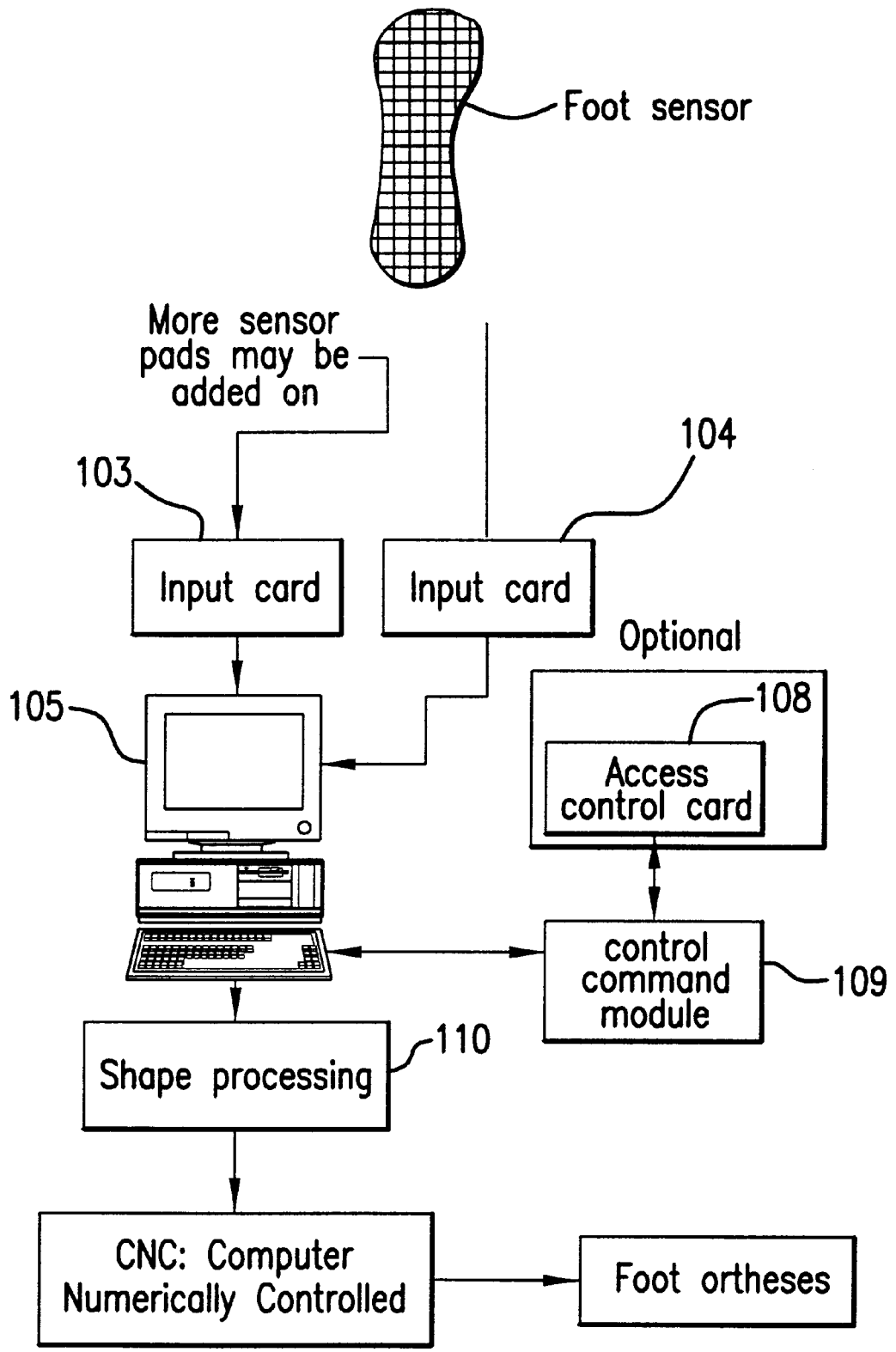
FIG. 14 is a perspective view of a sole incorporating the components shown in FIG. 9.

FIG. 13 is similar to FIG. 12, with the wheelchair replaced by a medical bed. FIG. 14 depicts a sole sensor and including the components of FIG. 8, and a shape processing apparatus 110, which receives output of the computer 105 and sends control signals to a CNC milling machine 112. Foot ortheses 114 are produced by the CNC milling machine 112.

What is claimed is:

1. An apparatus for positioning a human body comprising:
a seat having a plurality of adjustable components;
a plurality of sensors disposed on said seat;
at least one capacitive pressure cushion for sensor reading;
a plurality of actuators and transducers for moving said plurality of components relative to one another; and
a computer for controlling said seat, said computer receiving output from said plurality of sensors, said at least one capacitive pressure cushion and said plurality of actuators and transducers, and sending control signals to said actuators and transducers to adjust positions of said plurality of components, based upon said output from said plurality of sensors, said at least one capacitive pressure cushion and said plurality of actuators and transducers, and data stored in said computer, said data comprising information concerning said body to be positioned, positioning techniques, and presetting parameters.

2. An apparatus as recited in claim 1, wherein said plurality of components comprise:
a seat, a backrest, a head rest, an anterior wedge, a pair of armrests, a footrest, a pair of pelvic rests, and a pair of thoracic supports.

3. An apparatus as recited in claim 1, wherein said computer controls more than one of said seats.

4. An apparatus as recited in claim 1, wherein said computer prepositions said seat to a position which is comfortable for a majority of people.

5. An apparatus as recited in claim 1, wherein said seat can be positioned automatically by said computer, and can be positioned manually by an occupant.

6. An apparatus as recited in claim 1, wherein said computer develops pressure mappings and determines an occupants center of gravity.

7. An apparatus as recited in claim 1, wherein said computer controls a position of said seat and continuously corrects said position.

8. An apparatus as recited in claim 1, wherein said computer holds information regarding a favorite position of an occupant.

9. An apparatus as recited in claim 3, wherein said seats are airplane seats and said computer maintains a count of passengers situated in said seats.

10. An apparatus as recited in claim 3, wherein said computer indicates locations of each passenger in said seats.

11. An apparatus as recited in claim 3, wherein said computer controls said seats to be in upright positions during takeoffs and landings.

12. An apparatus as recited in claim 3, wherein said computer controls movements of said seats to provide wake-up services by slightly moving one of said seats.

13. An apparatus as recited in claim 1, wherein said seat is a wheelchair.

14. An apparatus as recited in claim 13, wherein said computer modifies a position of said wheelchair depending upon at least one of: a time of day, an amount of time spent in said wheelchair and specific activities undertaken by an occupant.

15. An apparatus as recited in claim 1, wherein said plurality of components comprise a seat, a backrest, a head rest, an anterior wedge, a pair of armrests, a footrest, a pair of pelvic rests, and a pair of thoracic supports, wherein said backrest is angularly and vertically adjustable relative to said seat, said headrest is vertically adjustable, said foot rest is angularly adjustable, said pair of pelvic rests are adjustable toward and away from said backrest, said pair of thoracic rests are adjustable toward and away from said backrest, said anterior wedge is vertically adjustable from said seat, and said backrest is vertically adjustable relative to said seat, and said seat is adjustable toward and away from said backrest.

16. An apparatus as recited in claim 3, wherein said system provides shape calculus, derived from said pressure sensors, to a computer numerically controlled milling machine, to manufacture a product from a CAD/CAM system.

17. An apparatus for positioning a human body comprising:

a bed having a plurality of adjustable components;

a plurality of sensors disposed on said bed;

at least one capacitive pressure cushion for sensor reading;

a plurality of actuators and transducers for moving said plurality of components relative to one another; and a computer for controlling said bed, said computer receiving output from said plurality of sensors, said at least one capacitive pressure cushion and said plurality of actuators and transducers, and sending control signals to said actuators and transducers to adjust positions of said plurality of components, based upon said output from said plurality of sensors, said plurality of actuators and transducers, and said at least one capacitive pressure cushion, and data stored in said computer, said data comprising information concerning said human body to be positioned, positioning techniques, and presetting parameters.

* * * * *